United States Patent
Ji et al.

(10) Patent No.: US 12,445,969 B2
(45) Date of Patent: Oct. 14, 2025

(54) POWER CONTROL METHOD AND APPARATUS

(71) Applicant: HUAWEI TECHNOLOGIES CO., LTD., GuangDong (CN)

(72) Inventors: Liuliu Ji, Shanghai (CN); Haicun Hang, Shanghai (CN); Xiaoyan Bi, Ottawa (CA); Hongzhe Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 426 days.

(21) Appl. No.: 17/961,928

(22) Filed: Oct. 7, 2022

(65) Prior Publication Data

US 2023/0030483 A1 Feb. 2, 2023

Related U.S. Application Data

(63) Continuation of application No. PCT/CN2020/084312, filed on Apr. 10, 2020.

(51) Int. Cl.
*H04W 52/14* (2009.01)
*H04W 52/36* (2009.01)

(52) U.S. Cl.
CPC ......... *H04W 52/146* (2013.01); *H04W 52/36* (2013.01)

(58) Field of Classification Search
CPC ... H04W 52/04; H04W 52/08; H04W 52/146; H04W 52/36; H04W 52/225
See application file for complete search history.

(56) References Cited

U.S. PATENT DOCUMENTS

| | | | |
|---|---|---|---|
| 8,311,053 B2 * | 11/2012 | Choi | H04W 52/54 370/442 |
| 9,198,169 B2 * | 11/2015 | Lee | H04L 5/0051 |

(Continued)

FOREIGN PATENT DOCUMENTS

| | | |
|---|---|---|
| CN | 102308640 A | 1/2012 |
| CN | 105379368 A | 3/2016 |
| CN | 108811138 A | 11/2018 |
| CN | 109600826 A | 4/2019 |
| CN | 110536394 A | 12/2019 |

(Continued)

OTHER PUBLICATIONS

Samsung: "Further considerations of support for multi-PDCCH based multi-TRP operation", 3GPP Draft; R2-1912515, Oct. 4, 2019, XP051804520 , total 5 pages.

(Continued)

*Primary Examiner* — Quochien B Vuong
(74) *Attorney, Agent, or Firm* — Rimon PC

(57) ABSTRACT

A power control method and apparatus are disclosed. The method is applied to a terminal that has a capability of supporting a configuration with a plurality of control resource set pool indexes and/or that is configured with the plurality of control resource set pool indexes. The method includes receiving a first physical downlink control channel (PDCCH) sent by a network device, where the first PDCCH carries a power offset corresponding to a physical uplink shared channel (PUSCH). The method further includes determining a transmit power based on a power control process corresponding to the network device, where the power control process is used for accumulating power offsets indicated by the network device, and determining the transmit power for the PUSCH based on an accumulation result. The method further includes sending the PDCCH to the network device at the transmit power.

16 Claims, 4 Drawing Sheets

(56) References Cited

U.S. PATENT DOCUMENTS

| | | | | |
|---|---|---|---|---|
| 9,668,220 | B2* | 5/2017 | Gao | H04W 52/40 |
| 11,234,199 | B2* | 1/2022 | Xu | H04W 52/36 |
| 2020/0015176 | A1* | 1/2020 | Li | H04W 52/52 |

FOREIGN PATENT DOCUMENTS

| | | |
|---|---|---|
| CN | 110536464 A | 12/2019 |
| CN | 110784917 A | 2/2020 |
| CN | 110875814 A | 3/2020 |

OTHER PUBLICATIONS

Qualcomm Incorporated, Enhancements to Scheduling and HARQ for eURLLC . 3GPP TSG-RAN WG1 #99, Nov. 18 22th, 2019, Reno, Nevada, USA, R1-1912962, 13 pages.

Ntt Docomo, Inc., Enhancements to scheduling/HARQ for URLLC. 3GPP TSG RAN WG1 #99, Reno, US, Nov. 18 22th, 2019, R1-1912888, 7 pages.

3GPP TS 38.211 V16.1.0 (Mar. 2020), 3rd Generation Partnership Project; Technical Specification Group Radio Access Network; NR; Physical channels and modulation(Release 16), 130 pages.

3GPP TS 38.212 V16.1.0 (Mar. 2020), 3rd Generation Partnership Project; Technical Specification Group Radio Access Network; NR; Multiplexing and channel coding(Release 16), 146 pages.

3GPP TS 38.213 V16.1.0 (Mar. 2020), 3rd Generation Partnership Project; Technical Specification Group Radio Access Network; NR; Physical layer procedures for control(Release 16), 156 pages.

3GPP TS 38.214 V16.1.0 (Mar. 2020), 3rd Generation Partnership Project; Technical Specification Group Radio Access Network; NR; Physical layer procedures for data(Release 16), 151 pages.

* cited by examiner (a) Non-coordinated  (c) JT (b) CS/CB  (d) DCS

POWER CONTROL METHOD AND APPARATUS

CROSS-REFERENCE TO RELATED APPLICATIONS

This application is a continuation of International Application No. PCT/CN2020/084312, filed on Apr. 10, 2020. The disclosure of the aforementioned application is hereby incorporated by reference in its entirety.

TECHNICAL FIELD

This application generally relates to the field of communication technologies, and in particular, to a power control method and apparatus.

BACKGROUND

A physical uplink shared channel (PUSCH) is an uplink signal sent by user equipment (UE), and a transmit power for the PUSCH may be controlled by a base station. For example, the base station may indicate to the UE to decrease the transmit power when the power for the PUSCH sent by the UE is high, while the base station may indicate to the UE to increase the transmit power when the power for the PUSCH sent by the UE is low. The behavior of controlling a transmit power of a terminal device by a base station may be referred to as closed-loop power control. The closed-loop power control may be dynamically indicated based on downlink control information (DCI), where the DCI carries a power offset.

In a scenario in which a transmission reception point (TRP) performs independent scheduling in any time sequence, for example when UE sends a PUSCH, the UE may determine a transmit power for the PUSCH based on a latest transmit power plus a power offset indicated in DCI corresponding to the PUSCH. For example, the latest transmit power may be P, and it is assumed that a power offset indicated in the DCI for sending the PUSCH by the UE in a slot i+2 is +1. In this case, the transmit power corresponding to the PUSCH is P+1. However, in a scenario in which two or more TRPs perform independent scheduling in any time sequence, a solution to how UE determines a transmit power is desired.

SUMMARY

Embodiments of this application provide a power control method and apparatus, a chip, a computer-readable storage medium, a computer program product, and the like, to improve accuracy of determining a transmit power by a terminal device in a multi-transmission reception point (TRP) coordination transmission scenario.

According to a first aspect, an embodiment of this application provides a power control method. The method may be applied to a terminal side, for example, a terminal device, or a chip or a chip set in the terminal device. The terminal has a capability of supporting a configuration with a plurality of control resource set (CORESET) pool indexes. Alternatively, the terminal may be configured with a plurality of CORESET pool indexes. Alternatively, the terminal may have a capability of supporting a configuration with a plurality of CORESET pool indexes and is configured with the plurality of CORESET pool indexes. The method includes: receiving a first physical downlink control channel (PDCCH) sent by a network device, where the first PDCCH carries a power offset corresponding to a physical uplink shared channel (PUSCH); determining a transmit power based on a power control process corresponding to the network device, where the power control process is for accumulating power offsets carried by PDCCHs from the network device, and determining the transmit power for the PUSCH based on an accumulation result; and sending the PUSCH to the network device at the transmit power.

In embodiments, the network device is associated with the power control process, so that the power offsets from the same network device may be accumulated by using the power control process. In this way, the transmit power for the PUSCH can be consistent with an indication from the network device, so that uplink transmission reliability can be improved.

In a possible design, there may be a correspondence between the power control process and a CORESET pool corresponding to the first PDCCH. In the foregoing design, the power control process is associated with the CORESET pool corresponding to the PDCCH, so that power offsets scheduled by the same CORESET pool can be independently accumulated.

In a possible design, before the transmit power is determined based on the power control process corresponding to the network device, a second PDCCH sent by the network device may be received. The second PDCCH carries indication information of the power control process. The indication information indicates that there is a correspondence between the power control process and a CORESET pool corresponding to the second PDCCH. The second PDCCH and the first PDCCH correspond to the same CORESET pool. In the foregoing design, an association relationship between the power control process and the network device may be indicated by the network device, so that accuracy of the transmit power can be further improved.

In a possible design, the indication information of the power control process may be a sounding reference signal resource indicator (SRS resource indicator, SRI), and there is a correspondence between a value of the SRI and an index of the power control process.

In a possible design, the indication information of the power control process may be the index of the power control process.

In a possible design, there is a correspondence between the value of the SRI and a power control parameter set used in the power control process.

In a possible design, before the transmit power is determined based on the power control process corresponding to the network device, it may be determined to send feedback information for PDSCHs from different network devices on different physical uplink control channels PUCCHs. According to the foregoing design, when a feedback mode is separate feedback, the terminal device may implement the power control method provided in this application.

According to a second aspect, this application provides a power control apparatus. The apparatus may be a terminal device, or may be a chip or a chip set in the terminal device. The apparatus may include a processing module and a transceiver module. When the apparatus is a terminal device, the processing module may be a processor, and the transceiver module may be a transceiver. The apparatus may further include a storage module. The storage module may be a memory. The storage module is configured to store instructions. The processing module executes the instructions stored in the storage module, to enable the terminal device to perform corresponding functions in the first aspect. When the apparatus is a chip or a chip set in the terminal device, the processing module may be a processor, a processing circuit, a logic circuit, or the like, and the transceiver module may be an input/output (I/O) interface, a pin, a circuit, or the like. The processing module executes instructions stored in the storage module, to enable the terminal device to perform corresponding functions in the first aspect. The storage module may be a storage module (for example, a register or a cache) in the chip or the chip set, or may be a storage module (for example, a read-only memory (ROM) or a random access memory (RAM)) that is in the base station and that is located outside the chip or the chip set.

According to a third aspect, a power control apparatus is provided, including a processor. Optionally, the apparatus further includes a communication interface and/or a memory. The communication interface is configured to transmit information, and/or a message, and/or data between the apparatus and another apparatus. The memory is configured to store computer-executable instructions. When the apparatus runs, the processor executes the computer-executable instructions stored in the memory, to enable the apparatus to perform the method in any one of the first aspect or the designs of the first aspect.

According to a fourth aspect, an embodiment of this application provides a computer storage medium. The computer storage medium stores program instructions, and when the program instructions are run on a communication device, the communication device is enabled to perform the method in any one of the first aspect or the possible designs of the first aspect in embodiments of this application.

According to a fifth aspect, an embodiment of this application provides a computer program product. When the computer program product runs on a communication device, the communication device is enabled to perform the method in any one of the first aspect or the possible designs of the first aspect in embodiments of this application.

According to a sixth aspect, an embodiment of this application provides a chip. The chip is coupled to a memory, to perform the method in any one of the first aspect or the possible designs of the first aspect in embodiments of this application.

According to a seventh aspect, an embodiment of this application provides a chip, including a communication interface and at least one processor. The processor runs to perform the method in any one of the first aspect or the designs of the first aspect in embodiments of this application.

It should be noted that "coupling" in embodiments of this application indicates a direct combination or an indirect combination of two components.

DESCRIPTION OF EMBODIMENTS

Figure 1:
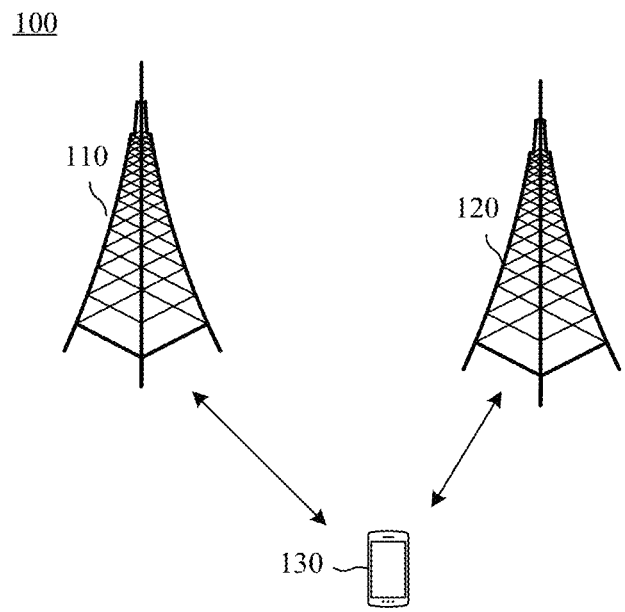
FIG. 1 is a schematic diagram of an architecture of a communication system according to an embodiment of this application.

To facilitate understanding of embodiments of this application, the following describes terms related to embodiments of this application.

1. Control Resource Set (CORESET)

To improve efficiency for blind detection on a control channel by a terminal device, a concept of a control resource set is proposed in a new radio (NR) standard formulation process. A network device may configure one or more resource sets for the terminal device, to send a physical downlink control channel (PDCCH). The network device may send, to the terminal device, a control channel on any control resource set corresponding to the terminal device. In addition, the network device may further need to notify the terminal device of another configuration associated with the control resource set, for example, a search space set. Control resource sets include different configuration information, for example, a frequency domain width difference or a time domain length difference. It is possible that the control resource set in this application may be a CORESET, a control region, or an enhanced physical downlink control channel (ePDCCH) set defined in a fifth-generation (5G) mobile communication system.

A time-frequency location occupied by a PDCCH may be referred to as a downlink control region. In long-term evolution (LTE) wireless broadband communication, the PDCCH is always located on a first m (where the values of m may be 1, 2, 3, and 4) symbols of a subframe.

In NR, the downlink control region may be flexibly configured by using radio resource control (RRC) signaling through the CORESET and the search space set.

Information such as a frequency domain location of a PDCCH or a control channel element (CCE) and a quantity of contiguous symbols in time domain may be configured in the control resource set.

Information such as a detection periodicity and an offset for PDCCH detection, and a start symbol in a slot may be configured in the search space set.

For example, in the search space set, a PDCCH periodicity may be configured as one slot, and a start symbol in time domain is a symbol 0. In this case, the terminal device may detect a PDCCH at a start location of each slot.

2. Search space

The search space defines a possibility of detecting a PDCCH in time domain. A base station may configure, for user equipment (UE), an identifier of the search space, an identifier of a CORESET associated with the search space, a detection time unit periodicity and a time unit offset of a PDCCH, a time domain detection pattern, a quantity (including 0) of possible PDCCH candidates for each aggregation level, a search space type (indicating whether the search space is a public search space or a UE-specific search space, where "public" means that another user may perform detection in the search space), a configuration (for example, a possibility of a DCI format to be detected) related to a DCI format, and a consecutive length.

The time domain detection pattern is used to indicate a symbol location at which UE may detect a PDCCH in one slot. For example, the time domain detection pattern may indicate one or more symbol locations. These symbol locations may all correspond to the possible $1^{st}$ symbol locations at which the PDCCH start. For example, if the time domain detection pattern may indicate symbol locations 11, 12, and 13, the UE may detect the PDCCH at locations starting from the symbols 11, 12, and 13.

The quantity (including 0) of possible PDCCH candidates for each aggregation level means that the base station may configure, for the UE, quantities of possible PDCCH candidates separately corresponding to different aggregation levels 1, 2, 4, 8, and 16 in one search space.

The consecutive length is a duration of the search space in a time domain time unit. Using a slot as an example, if a configured periodicity is k, and the duration is d, the PDCCH may be detected in the search space in all d consecutive slots starting from a slot that satisfies a periodicity and an offset of the search space.

It should be noted that, with continuous development of technologies, the terms in embodiments of this application may change, but all of them fall within the protection scope of this application.

To make objectives, technical solution, and advantages of embodiments of this application clearer, the following further describes embodiments of this application in detail with reference to the accompanying drawings.

The communication method provided in this application may be applied to various communication systems, for example, the Internet of Things (IoT), a narrowband Internet of Things (NB-IoT), LTE, a 5G communication system, a hybrid architecture of LTE and 5G, a 5G NR system, or a new communication system emerging in future communication development. The 5G communication system described in this application may include at least one of a non-standalone (NSA) 5G communication system or a standalone (SA) 5G communication system. The communication system may alternatively be a public land mobile network (PLMN), a device-to-device (D2D) network, a machine-to-machine (M2M) network, or another network.

FIG. 1 shows a communication system 100 applicable to embodiments of this application. The communication system 100 is in a dual connectivity (DC) or coordinated multipoint transmission/reception (CoMP) scenario. The communication system 100 includes a network device 110, a network device 120, and a terminal device 130. The network device 110 may be a network device initially accessed by the terminal device 130, and is responsible for RRC communication with the terminal device 130. The network device 120 is added during RRC reconfiguration, and is configured to provide an additional radio resource. The terminal device 130 on which carrier aggregation (CA) is configured is connected to the network device 110 and the network device 120. A link between the network device 110 and the terminal device 130 may be referred to as a first link, and a link between the network device 120 and the terminal device 130 may be referred to as a second link.

The foregoing communication systems applicable to embodiments of this application are merely examples for description. Communication systems applicable to embodiments of this application are not limited thereto. For example, a quantity of network devices and a quantity of terminal devices included in the communication system may be other quantities, or a single base station scenario, a multi-carrier aggregation scenario, a dual connectivity scenario, a D2D communication scenario, or a CoMP scenario is used. CoMP may be one or more of a non-coherent joint transmission (NCJT) scenario, a coherent joint transmission (CJT) scenario, a joint transmission (JT) scenario, or the like.

A terminal device in embodiments of this application is an entity that is on a user side and that is configured to receive or transmit a signal. The terminal device may be a device that provides voice and data connectivity for a user, for example, a handheld device or a vehicle-mounted device having a wireless connection function. The terminal device may also be referred to as a wireless terminal, a subscriber unit, a subscriber station, a mobile station, a remote station, an access point, a remote terminal, an access terminal, a user terminal, a user agent, a user device, user equipment, or the like. The terminal device may be a mobile terminal, for example, a mobile phone (which is alternatively referred to as a "cellular" phone), and a computer that has a mobile terminal. For example, the terminal device may be a portable, pocket-sized, handheld, computer built-in, or vehicle-mounted mobile apparatus, which exchanges a voice and/or data with a radio access network. For example, the terminal device may alternatively be a device such as a personal communications service (PCS) phone, a cordless telephone set, a session initiation protocol (SIP) phone, a wireless local loop (WLL) station, or a personal digital assistant (PDA). For example, common terminal devices include a mobile phone, a tablet computer, a notebook computer, a palmtop computer, a mobile Internet device (MID), and a wearable device such as a smartwatch, a smart band, or a pedometer. However, embodiments of this application are not limited thereto. The terminal device in embodiments of this application may alternatively be a terminal device or the like appearing in a future evolved public land mobile network (PLMN). This is not limited in embodiments of this application.

In addition, the terminal device in embodiments of this application may alternatively be a terminal device in an IoT system. IoT is an important part of future development of information technologies. A main technical feature of the IoT is connecting a device to a network by using a communication technology, to implement an intelligent network for interconnection between a person and a machine or between things. In embodiments of this application, an IoT technology may implement massive connections, deep coverage, and terminal power saving by using, for example, a narrowband (NB) technology.

In addition, in embodiments of this application, the terminal device may further include a sensor, for example, an intelligent printer, a train detector, or a gas station. Main functions of the terminal device include collecting data (by some terminal devices), receiving control information and downlink data from a network device, sending an electromagnetic wave, and transmitting uplink data to the network device.

The network device in embodiments of this application is an entity on a network side that is configured to transmit or receive a signal. The network device in embodiments of this application may be a device in a wireless network, for example, a radio access network (RAN) node that connects the terminal to the wireless network. For example, the network device may be an evolved NodeB (eNB or e-NodeB) in LTE, or may be a new radio controller (NR controller), may be a gNodeB (gNB) in a 5G system, may be a centralized unit (CU), may be a new radio base station, may be a radio remote module, may be a micro base station, may be a relay, may be a distributed unit (DU), may be a home base station, may be a transmission reception point (TRP) or a transmission point (TP), or may be any other wireless access device. This is not limited in embodiments of this application. The network device may cover one or more cells.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

In a modern communication system, to improve spectrum utilization, intra-frequency deployment is mainly used. That is, a plurality of cells in a network may be deployed on a same frequency band. In this case, the terminal device may receive signals from a plurality of cells. When the terminal device is located in an edge area, the terminal device may be interfered with signals from a neighboring cell other than a current cell. As a result, a channel condition may be poor. CoMP may be widely used to resolve interference between the cells and improve a user data rate.

Figure 2:
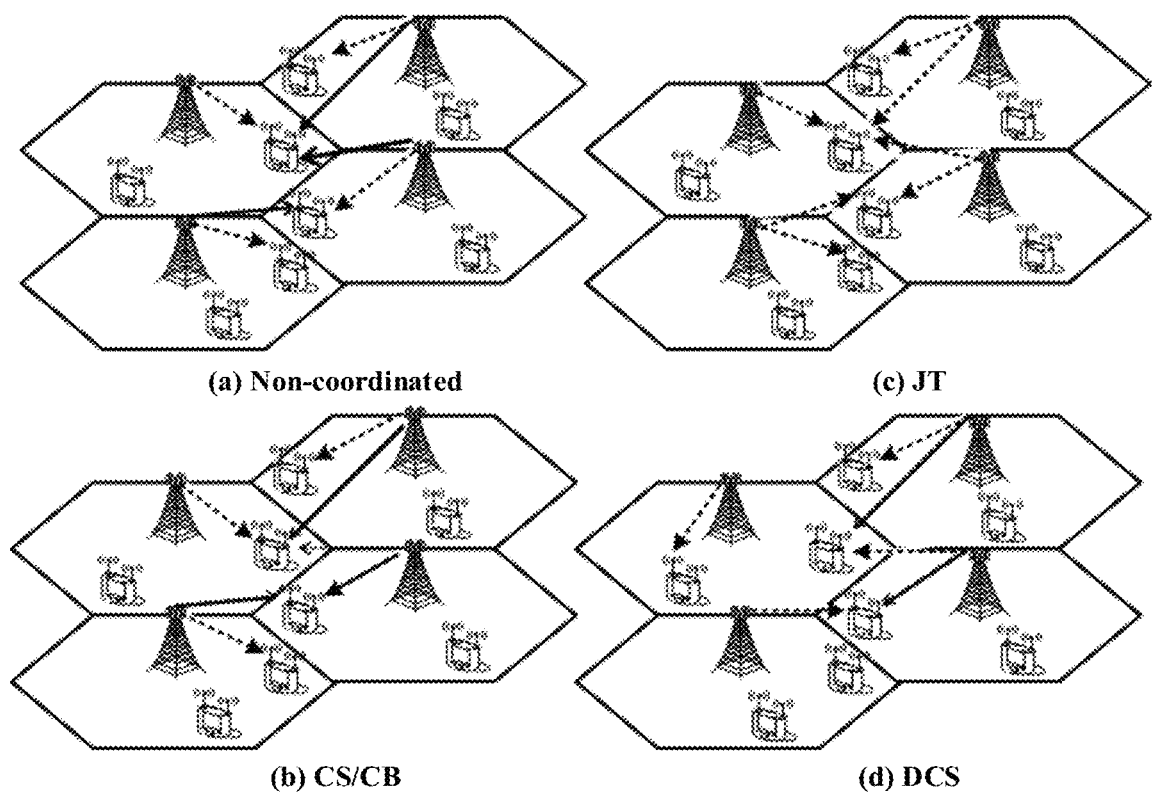
FIG. 2 is a schematic diagram of multi-transmission reception point (TRP) coordination according to an embodiment of this application.

The network device performs coordination by exchanging information, so that interference can be effectively avoided and the rate can be increased. A plurality of TRPs may provide the terminal device with a downlink service through coordination, or may receive an uplink signal of the terminal device through coordination. Coordination technologies mainly include JT, dynamic cell/point selection (DCS/DPS), coordinated interference/scheduling (CB/CS), and the like. As shown in FIG. 2, solid-line arrows indicate interference caused to a terminal device, and dashed-line arrows represent wanted data generated for the terminal device. In a non-coordinated scenario, an edge terminal device receives a signal of a current cell, and is interfered by a neighboring cell. In a JT technology, a plurality of cells jointly send data to the terminal device, and the terminal device receives a plurality of pieces of useful data. Therefore, a transmission rate can be increased. In a coordinated scheduling coordinated beamforming (CSCB) technology, interference from a neighboring cell is coordinated. For example, a to-be-sent signal in the neighboring cell may be adjusted to avoid being sent to the terminal device in a strong interference direction, so that an interference level of the terminal device is reduced. In a DPS/DCS technology, a network dynamically selects a better transmission point to serve the terminal device, so that the terminal device can ensure being under a stronger cell signal. In this case, a weaker cell signal becomes interference. A difference between channels of a plurality of TRPs can be used to improve a signal to interference plus noise ratio of the terminal device.

Figure 3:
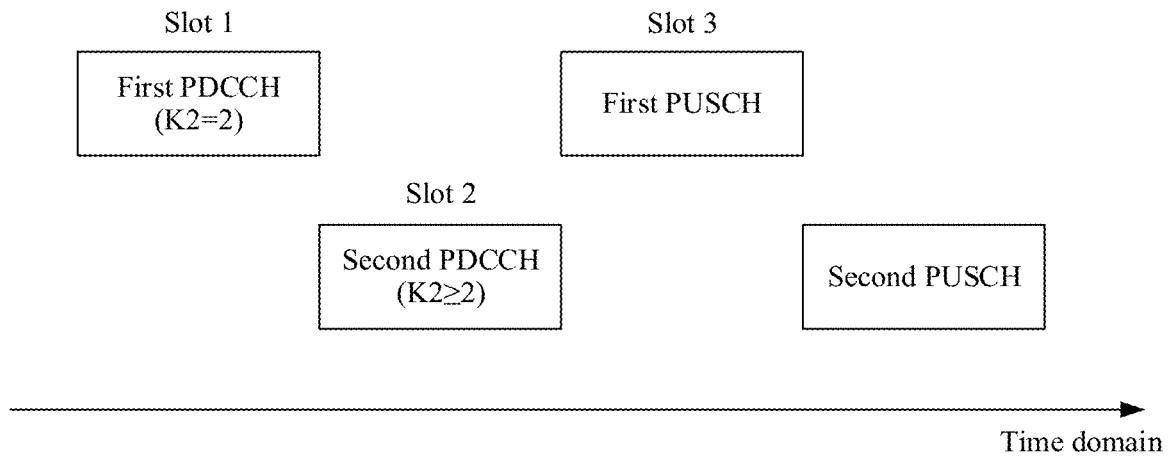
FIG. 3 is a schematic diagram of a physical downlink control channel (PDCCH) scheduling time sequence according to an embodiment of this application.

In a multi-TRP coordination transmission scenario, a plurality of TRPs may independently schedule a user. According to the $3^{rd}$ generation partnership project release 15 (3GPP R15) protocol, for example, as shown in FIG. 3, for two hybrid automatic repeat request (HARQ) processes in a scheduling cell, if UE is scheduled by a first PDCCH for a first PUSCH, the UE cannot be scheduled by a second PDCCH that is later than the first PDCCH to send a second PUSCH that is earlier than the first PUSCH. In other words, if the second PDCCH of the UE is received after the first PDCCH in time, the second PUSCH scheduled by the second PDCCH cannot be earlier than the first PUSCH scheduled by the first PDCCH.

A time sequence relationship K2 between a PUSCH scheduled by a PDCCH and the PDCCH may be indicated by a base station. The time sequence relationship K2 is a time offset from receiving the PDCCH by the UE to sending the PUSCH.

FIG. 3 is used as an example. If the first PDCCH is sent in a slot 1, and K2=2, the first PUSCH is sent in a slot 3. If the second PDCCH is sent in a slot 2, the second PUSCH scheduled by the second PDCCH needs to be later than the last symbol of the first PUSCH. Therefore, the base station needs to ensure that a K2 value of the second PDCCH is greater than or equal to a K2 value of the first PDCCH. For example, the K2 value of the second PDCCH may be 2. In this case, the second PUSCH is sent in a slot 4. In a multi-TRP coordination transmission scenario, if the first PDCCH and the second PDCCH are separately from two TRPs, to satisfy this limitation, the two TRPs need to closely communicate with each other. For example, the two TRPs know a K2 indication during scheduling the UE by each of the two TRPs, where the K2 indication ensures that the UE can perform processing. This imposes a high requirement on a delay of communication between the TRPs.

However, in an actual network, the TRPs generally may not communicate with each other in real time. For example, an interaction delay between the TRPs may be 0 ms to 5 ms, or may be 15 ms to 20 ms. In some actual deployment scenarios, scheduling is greatly limited. For this problem, when the UE identifies that DCI is from a same TRP, the foregoing time sequence limitation may be satisfied. In other words, if the first PDCCH and the second PDCCH are from a same TRP, the second PDCCH of the UE is received after the first PDCCH in time, the second PUSCH scheduled by the second PDCCH cannot be earlier than the first PUSCH scheduled by the first PDCCH. If the DCI is from different TRPs, the foregoing time sequence limitation may not be satisfied. If the second PDCCH of the UE is received after the first PDCCH in time, the second PUSCH scheduled by the second PDCCH may be earlier than the first PUSCH scheduled by the first PDCCH, or the second PUSCH may be later than the first PUSCH. Alternatively, the second PUSCH and the first PUSCH may be in a same slot. In this way, the two TRPs may perform free scheduling without real-time communication.

The foregoing slot is merely an example of a time concept. It should be understood that the time concept in this application may alternatively be a symbol, a frame, or the like.

A transmit power of the PUSCH may be controlled by the base station. For example, the base station may indicate the UE to decrease the transmit power when the power for the PUSCH sent by the UE is high, while the base station may indicate the UE to increase the transmit power when the power for the PUSCH sent by the UE is low. A behavior of controlling a transmit power of a terminal device by the base station may be referred to as closed-loop power control. The closed-loop power control may be dynamically indicated based on DCI, and the DCI carries a power offset.

In a scenario in which a TRP performs independent scheduling in any time sequence, when the UE sends a PUSCH, the UE may add, to a latest transmit power, a power offset indicated in DCI corresponding to the PUSCH, to determine a transmit power for the PUSCH. For example, the latest transmit power may be P, and it is assumed that a power offset indicated in the DCI for sending the PUSCH by the UE in a slot i+2 is +1. In this case, the transmit power corresponding to the PUSCH is P+1. However, in a scenario in which two or more TRPs perform independent scheduling in any time sequence, a solution to how UE determines a transmit power is desired.

Figure 4:
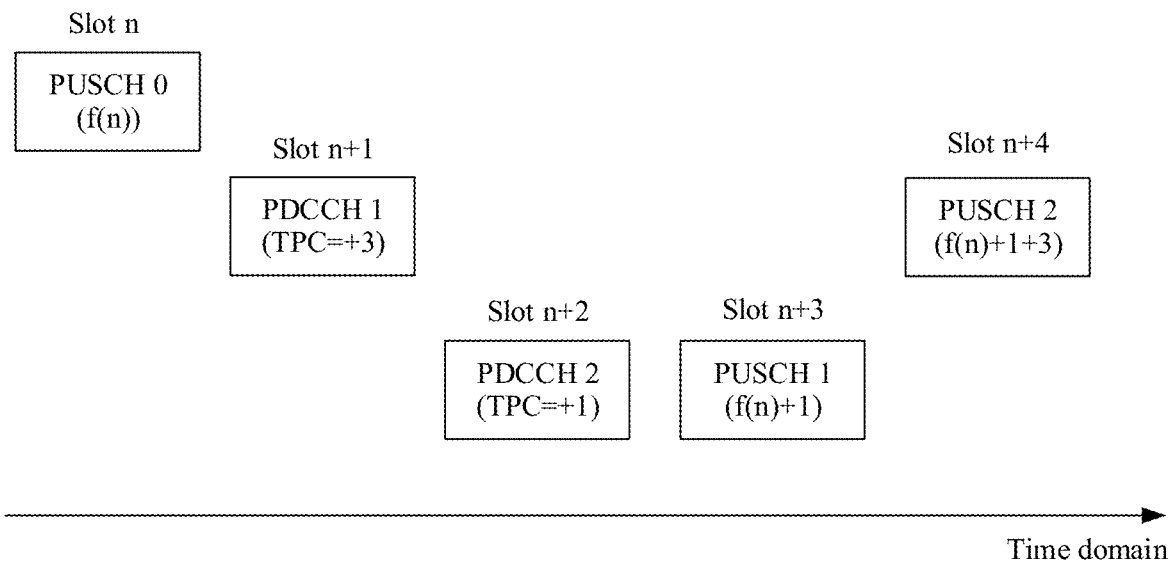
FIG. 4 is a schematic diagram of power control in a multi-TRP coordination scenario according to an embodiment of this application.

When the two or more TRPs perform independent scheduling in any time sequence, if the UE still uses the power control method in the scenario of one TRP, some problems may occur. For example, a transmit power on which the UE determines a transmit power for a PUSCH based may be different from a transmit power on which the base station indicates, by using DCI, the transmit power for the PUSCH. For example, as shown in FIG. 4, a transmit power at which UE sends a PUSCH 0 in a slot n is f(n). The UE receives a PDCCH 1 in a slot n+1. The PDCCH 1 is used to indicate to send a PUSCH 1 in a slot n+4, and a power offset indicated by the PDCCH 1 is +3. The UE receives a PDCCH 2 in a slot n+2. The PDCCH 2 is used to indicate to send a PUSCH 2 in a slot n+3, and a power offset indicated by the PDCCH 2 is +1. The UE sends the PUSCH 2 in the slot n+3, and a transmit power for the PUSCH 2 is a sum of the transmit power for sending a PUSCH (namely, the PUSCH 0) most recently and the power offset indicated by the PDCCH 2, that is, the transmit power for the PUSCH 2 is f(n)+1. The UE sends the PUSCH 1 in the slot n+4, and a transmit power for the PUSCH 1 is a sum of the transmit power for sending a PUSCH (namely, the PUSCH 2) most recently and the power offset indicated by the PDCCH 1, that is, the transmit power for the PUSCH 1 is f(n)+1+3. However, when the base station sends the PDCCH 1, the PUSCH most recently sent by the UE is the PUSCH 0 sent in the slot n. As a result, the base station sends the PDCCH 1 based on the power offset indicated by the transmit power f(n) for the PUSCH 0, that is, the transmit power that is indicated by the base station and that is for the PUSCH 1 is f(n)+3. The transmit power on which the UE determines the transmit power for the PUSCH based is different from the transmit power on which the base station indicates, by using the DCI, the transmit power for the PUSCH based. As a result, the transmit power while sending the PUSCH 1 by the UE is inconsistent with the transmit power indicated by the base station. Consequently, a problem occurs in power management of the base station. For example, the transmit power of the UE is excessively high, and interference is caused to another user. If the transmit power is excessively low, a received signal to noise indicator (SNR) is excessively low, a modulation and coding scheme (MCS) of data does not match a channel, or the like.

Based on this, embodiments of this application provide a power control method and apparatus, to improve accuracy of PUSCH power control in a multi-TRP transmission scenario. The method and an apparatus are based on a same concept. Because the method and the apparatus have a similar problem-resolving principle, for implementations of the apparatus and the method, refer to each other, and no repeated description is provided.

In embodiments of this application, time domain/a time unit may be a frame, a radio frame, a system frame, a subframe, a half frame, a slot, a mini-slot, a symbol, or the like. Data may be a codeword, a transport block, a code block, or a code block group.

It should be understood that, in embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may represent: a, b, c, a and b, a and c, b and c, or a, b, and c, where a, b, and c may be singular or plural.

In addition, it should be understood that, in the descriptions of this application, terms such as "first" and "second" are only used for a purpose of distinguishing descriptions, but cannot be understood as indicating or implying relative importance, or as indicating or implying a sequence, or indicating a quantity.

The following further describes the method provided in embodiments of this application in detail with reference to the accompanying drawings.

Figure 5:
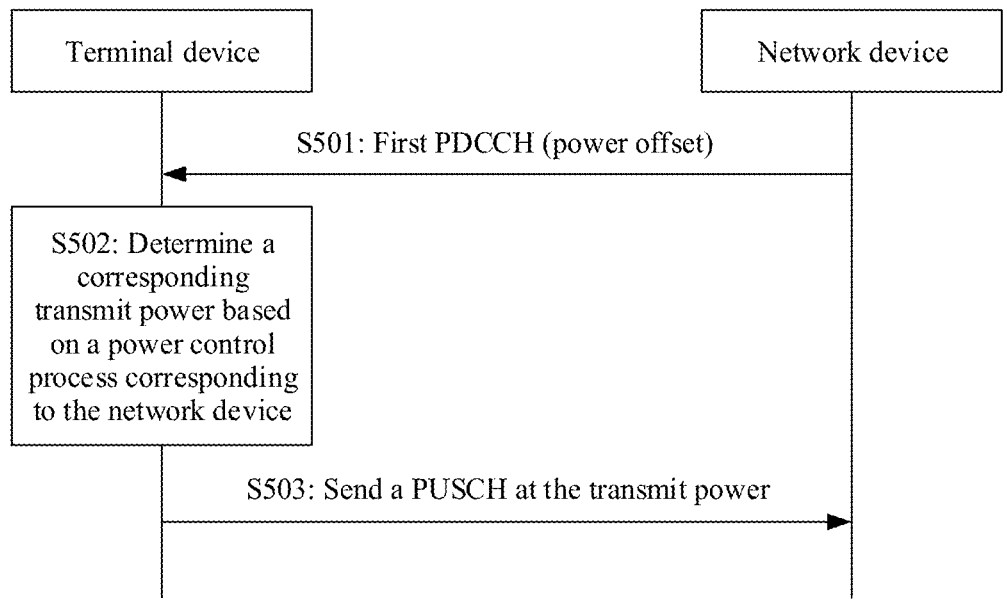
FIG. 5 is a schematic flowchart of a power control method according to an embodiment of this application.

FIG. 5 is a schematic flowchart of a power control method according to embodiments of this application. The method may be applied to a terminal device, a chip in the terminal device, a chip set in the terminal device, or the like. The terminal device has a capability of supporting a configuration with a plurality of CORESET pool indexes. Alternatively, the terminal device may be configured with a plurality of CORESET pool indexes. Alternatively, the terminal device may have a capability of supporting a configuration with a plurality of CORESET pool indexes, and is configured with the plurality of CORESET pool indexes.

That the terminal device has a capability of supporting a configuration with a plurality of CORESET pool indexes may be understood as that the terminal device supports at least two CORESETs, and supports at least one CORESET to be configured with a same CORESET pool index. For example, the terminal device supports four CORESETs, where two of the CORESETs have a same CORESET pool index.

That the terminal device is configured with a plurality of CORESET pool indexes may be understood as that a base station provides at least one of the following configurations for the terminal device.

The base station configures at least two CORESET pool indexes having different values. For example, the base station configures four CORESETs. A CORESET pool index corresponding to a first CORESET and a second CORESET is configured as having a value 0, and a CORESET pool index corresponding to a third CORESET and a fourth CORESET is configured as having a value 1.

The base station configures a CORESET pool index of at least one CORESET as a default value, and a CORESET pool index of another CORESET is different from the default value. For example, the base station configures four CORESETs. A first CORESET and a second CORESET are not configured with a CORESET pool index, and a default value of the CORESET pool index corresponding to the first CORESET and the second CORESET is considered as having a value 0. A CORESET pool index corresponding to a third CORESET and a fourth CORESET is configured as having a value 1.

The base station configures a CORESET pool index of a part of CORESETs as a default value. A CORESET pool index of another part of CORESETs is set to a value equal to the default value. A CORESET pool index of still another part of CORESETs is set to a value different from the default value. For example, the base station configures four CORESETs. A first CORESET is not configured with a CORESET pool index, and a default value of the CORESET pool index corresponding to the first CORESET is considered as 0. A CORESET pool index corresponding to a second CORESET is set to a value 0. A CORESET pool index corresponding to a third CORESET and a fourth CORESET is configured as having a value 1.

That the terminal device is configured with a plurality of CORESET pool indexes may be that the terminal device is configured with a plurality of CORESET pool indexes for a currently activated bandwidth part (BWP), that the terminal device is configured with a plurality of CORESET pool indexes for all configured bandwidth parts in a serving cell, or that the terminal device is configured with a plurality of CORESET pool indexes for any configured bandwidth part in a serving cell.

The following uses a terminal device as an example for description. The method includes the following steps.

S501: A terminal device receives, for each of a plurality of network devices, a first PDCCH sent by the network device, where the first PDCCH carries a power offset corresponding to a PUSCH.

S502: The terminal device determines a corresponding transmit power based on a power control process corresponding to the network device, where the power control process corresponding to the network device is used to accumulate power offsets carried by PDCCHs from the network device, and determines the transmit power for the PUSCH based on an accumulation result.

It should be noted that, for the network device, the terminal device may not need to identify whether the network device is a network device 1 or a network device 2, but may distinguish the network device by using configuration information. Using a higher-layer parameter index as an example, it is assumed that for a CORESET 1 and a CORESET 2, it may be considered that all PDCCHs associated with the CORESET 1 are transmitted by a same network device, and all PDCCHs associated with the CORESET 2 are transmitted by a same network device. In this way, the network devices are distinguished.

There is an association relationship between the power control process and the network device. Alternatively, it may be understood as that there is an association relationship between the power control process and configuration information of the PDCCH, (for example, there is an association relationship between the power control process and configuration information of a CORESET pool corresponding to the PDCCH) or there is an association relationship between the power control process and the CORESET pool corresponding to the PDCCH. CORESETs having a same configuration index may belong to a same CORESET pool.

In an example description, there is a correspondence between the power control process corresponding to the network device and a CORESET pool corresponding to the first PDCCH. In an implementation, the terminal device may determine, based on the CORESET pool corresponding to the first PDCCH, the power control process corresponding to the network device.

For example, a transmit power determined by the power control process corresponding to the network device may satisfy the following formula. Alternatively, it may be understood as that the power control process may determine the transmit power by using the following formula:

$$P = \min\left\{ \begin{array}{l} P_{CMAX} \\ P_0 + 10\log_{10}(2^\mu \times M) + \alpha \times PL + \Delta + f \end{array} \right\}$$

P is the transmit power, and PCMAX is a maximum transmit power. $P_0$ is a reference power density, and may alternatively be understood as a receive power density level expected by the network device. p is a parameter related to a parameter set (a numerology), and the numerology may include a subcarrier spacing, a cyclic prefix length, or the like. M is a bandwidth of the PUSCH. a is a path-loss compensation factor. PL is a path loss, and PL may be obtained through measurement by the terminal device by receiving a downlink signal. A is an adjustment factor of a PUSCH code rate, and f is a closed-loop power adjustment value. When a power adjustment mode is accumulation, f is an accumulated value of power offsets indicated by the network device before the first PDCCH.

In an implementation, one or more sets of power control parameters may be configured for the terminal device. The power control parameter may include at least one of the following parameters: a maximum transmit power, a reference power density, a bandwidth of the PUSCH, a path-loss compensation factor, and an adjustment factor of a PUSCH code rate.

If one set of power control parameters is configured for the terminal device, power control processes corresponding to different network devices may use a same power control parameter, but a power control process corresponding to each network device independently accumulates power offsets. For example, power control processes corresponding to network devices 1 to 3 use a same power control parameter. However, the power control process corresponding to the network device 1 accumulates power offsets indicated by the network device 1, the power control process corresponding to the network device 2 accumulates power offsets indicated by the network device 2, and the power control process corresponding to the network device 3 accumulates power offsets indicated by the network device 3.

If a plurality of sets of power control parameters are configured for the terminal device, when no association relationship between an SRI and a power control parameter is configured, the terminal device may use one of the plurality of sets of power control parameters by default, and power control processes corresponding to different network devices may use the default power control parameters.

When the association relationship between the SRI and the power control parameter is configured, the terminal device may determine, based on an SRI value indicated by the network device, a power control parameter used by a corresponding power control process. For example, assuming that an SRI value indicated by a network device 1 is 0, a power control process corresponding to the network device may use a power control parameter corresponding to SRI=0. In an implementation, the network device may indicate the SRI to the terminal device by using an SRI field in DCI.

In a possible implementation, the association relationship between the network device and the power control process may be determined by the terminal device. For example, the terminal device determines a power control process 1 for a network device 1, where the power control process 1 accumulates power offsets indicated by the network device 1; and determines a power control process 2 for a network device 2, where the power control process 2 accumulates power offsets indicated by the network device 2, and so on.

In another possible implementation, the association relationship between the network device and the power control process may alternatively be indicated by the network device. For example, before sending the first PDCCH, the network device sends a second PDCCH to the terminal device. The second PDCCH and the first PDCCH correspond to the same CORESET pool, and the second PDCCH carries indication information of the power control process.

Therefore, the terminal device may associate the power control process indicated by using the indication information with the CORESET pool corresponding to the second PDCCH (namely, the CORESET pool corresponding to the first PDCCH).

For example, the indication information may directly indicate the power control process. For example, the indication information may be information such as an index or an identifier of the power control process.

Alternatively, the indication information may indirectly indicate the power control process. For example, the indication information may be an SRI, and there is a correspondence between a value of the SRI and an index of the power control process. In an implementation, the network devices may determine, through coordination, values of SRIs that can be separately used by the network devices. There may be one or more values of the SRI, for example, the value may be a value range.

In an implementation, if the indication information is the SRI, an SRI field in DCI carried by the second PDCCH may carry the indication information.

S503: The terminal device sends the PUSCH to the network device at the transmit power.

In some embodiments, the power control method provided in this application may be implemented in a specific feedback mode, for example, in a separate feedback mode. Separate feedback means that the terminal device feeds back, via different PUCCHs, an acknowledgement/negative acknowledgement (ACK/NACK) feedback information for data scheduled by a plurality of network devices. In the foregoing manner, in the case of a joint feedback mode, the terminal device may accumulate power offsets across network devices. Joint feedback means that the terminal device feeds back, via one PUCCH, ACK/NACK feedback information for data scheduled by a plurality of network devices. In the case of the separate feedback mode, power offsets of each network device may be separately accumulated.

Therefore, before determining the transmit power based on the power control process corresponding to the network device, the terminal device may determine to send feedback information for PDSCHs from different network devices on different physical uplink control channels PUCCHs.

In embodiment, the network device is associated with the power control process, so that the power offsets from the same network device may be accumulated by using the power control process. In this way, the transmit power for the PUSCH can be consistent with an indication from the network device, so that uplink transmission reliability is improved. For example, FIG. 4 is used as an example. It is assumed that a PDCCH 0 and a PDCCH 1 are information transmitted between a terminal device and a network device 1, and a PDCCH 2 is from a network device 2. When determining a transmit power for a PUSCH 1, the terminal device adds, to a transmit power for a PUSCH 0, a power offset indicated by the PDCCH 1. It may be determined that the transmit power for the PUSCH 1 is f(n)+3. The network device 1 indicates a power offset based on the PUSCH 0. In other words, a transmit power indicated by the network device 1 for the PUSCH 1 is f(n)+3. It can be learned that the transmit power for the PUSCH is consistent with an indication of the network device according to the method provided in these embodiments of this application.

Figure 6:
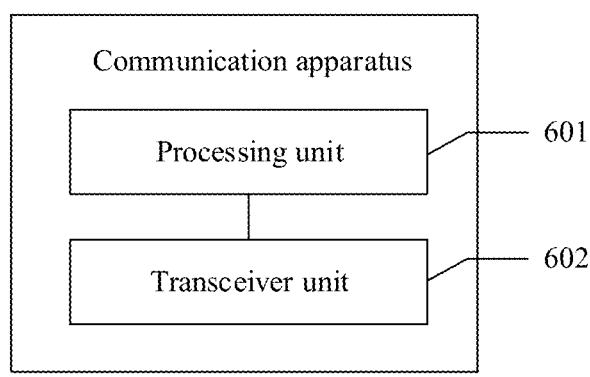
FIG. 6 is a schematic diagram of a structure of a power control apparatus according to an embodiment of this application.

Based on a same concept as that of the method embodiments, an embodiment of this application provides a communication apparatus. A structure of the communication apparatus may be shown in FIG. 6, and includes a processing unit 601 (e.g., a processing circuit) and a transceiver unit 602 (e.g., a transceiver circuit). The communication apparatus may be configured to implement the method performed by the terminal device in the embodiment illustrated in FIG. 5. The apparatus may be the terminal device, or may be a chip, a chip set, or a part of a chip, where the chip and the chip set are in the terminal device, and the part of the chip is configured to perform a function of a related method. The transceiver unit 602 is configured to receive a first PDCCH sent by a network device. The first PDCCH carries a power offset corresponding to a PUSCH. The processing unit 601 is configured to determine a transmit power based on a power control process corresponding to the network device, where the power control process is for accumulating power offsets carried by PDCCHs from the network device, and determine the transmit power for the PUSCH based on an accumulation result. The transceiver unit 602 is further configured to send the PUSCH to the network device at the transmit power.

For example, there is a correspondence between the power control process and a CORESET pool corresponding to the first PDCCH.

In an implementation, the transceiver unit 602 may further be configured to: before the processing unit 601 determines the transmit power based on the power control process corresponding to the network device, receive a second PDCCH sent by the network device. The second PDCCH carries indication information of the power control process. The indication information indicates that there is a correspondence between the power control process and a CORESET pool corresponding to the second PDCCH. The second PDCCH and the first PDCCH correspond to the same CORESET pool.

For example, the indication information of the power control process is an SRI, and there is a correspondence between a value of the SRI and an index of the power control process.

For example, there is a correspondence between the value of the SRI and a power control parameter set used in the power control process.

The processing unit 601 may further be configured to: before determining the transmit power based on the power control process corresponding to the network device, determine to send feedback information for PDSCHs from different network devices on different physical uplink control channels PUCCHs.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in embodiments of this application, further refer to related descriptions in the method embodiments.

Figure 7:
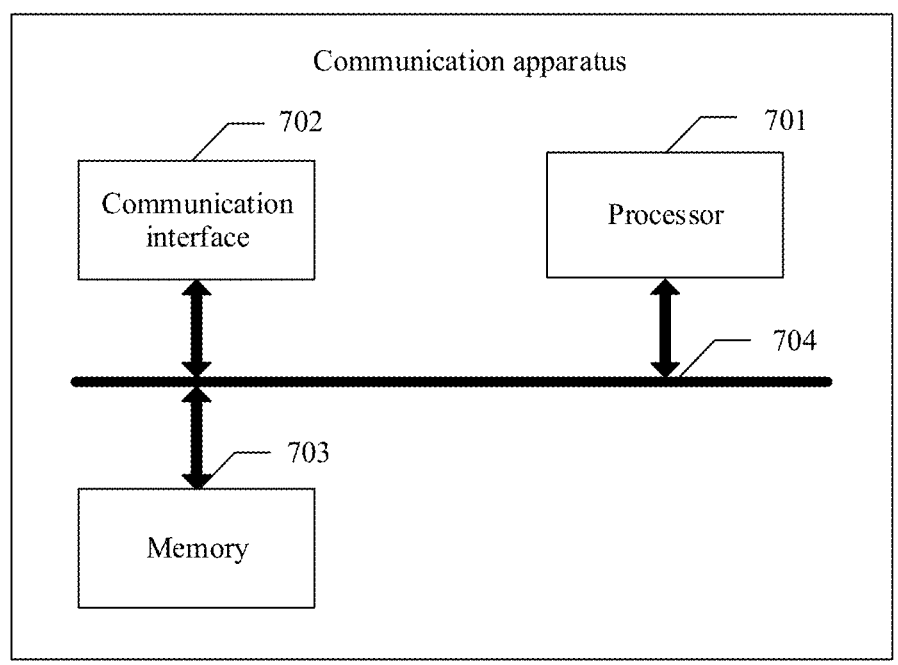
FIG. 7 is a schematic diagram of a structure of a power control apparatus according to an embodiment of this application.

In a possible manner, the communication apparatus may be shown in FIG. 7. The communication apparatus may be a terminal device or a chip in the terminal device. The apparatus may include a processor 701 and a communication interface 702. Optionally, the apparatus may further include a memory 703. The memory 703 may be disposed on the processor 701. The processing unit 601 may be the processor 701. The transceiver unit 602 may be the communication interface 702.

The processor 701 may be a central processing module (CPU), a digital processing module, or the like. The communication interface 702 may be a transceiver, an interface circuit such as a transceiver circuit, a transceiver chip, or the like. The apparatus further includes the memory 703, configured to store a program executed by the processor 701. The memory 703 may be a nonvolatile memory, for example, a hard disk drive (HDD) or a solid-state drive (SSD), or may be a volatile memory, for example, a RAM. The memory 703 is any other medium that can be configured to carry or store expected program code that has instructions or a data structure form and that can be accessed by a computer, but is not limited thereto.

The processor 701 is configured to execute the program code stored in the memory 703, and is configured to perform an action of the processing unit 601. Details are not described herein in this application. The communication interface 702 is configured to perform an action of the transceiver unit 602. Details are not described herein in this application.

Embodiments of this application do not limit a specific connection medium between the communication interface 702, the processor 701, and the memory 703. In these embodiments, in FIG. 7, the memory 703, the processor 701, and the communication interface 702 are connected by using a bus 704. The bus is represented by using a thick line in FIG. 7. A manner for connecting other components is only used as an example for description, and this embodiment is not limited thereto. The bus may be classified into an address bus, a data bus, a control bus, and the like. For ease of representation, only one bold line is used for representation in FIG. 7, but this does not mean that there is only one bus or only one type of bus.

An embodiment of the present disclosure further provides a computer-readable storage medium, configured to store computer software instructions that need to be executed by the processor. The computer software instructions include a program that needs to be executed by the processor.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a function in one or more procedures in the flowcharts and/or in one or more blocks in the block diagrams.

Clearly, a person skilled in the art can make various modifications and variations to this application without departing from the protection scope of this application. This application is intended to cover these modifications and variations of this application provided that they fall within the scope of protection defined by the following claims and their equivalent technologies.

What is claimed is:

1. A power control method, wherein the method is applied to a terminal, and the terminal has a capability of supporting a configuration with a plurality of control resource set (CORESET) pool indexes, the terminal is configured with a plurality of CORESET pool indexes, or the terminal has a capability of supporting a configuration with a plurality of CORESET pool indexes and is configured with the plurality of CORESET pool indexes, and the method comprises:
   receiving a first physical downlink control channel (PDCCH) sent by a network device, wherein the first PDCCH carries a power offset corresponding to a physical uplink shared channel (PUSCH);
   determining an accumulation result based on a power control process corresponding to the network device, wherein the power control process is used for accumulating power offsets carried by PDCCHs from the network device, and determining a transmit power for the PUSCH based on the accumulation result; and
   sending the PUSCH to the network device at the transmit power,
   wherein before the determining the transmit power based on the power control process corresponding to the network device, the method further comprises:
   receiving a second PDCCH sent by the network device, wherein the second PDCCH carries indication information of the power control process, the indication information indicates that there is a correspondence between the power control process and a CORESET pool corresponding to the second PDCCH, and the second PDCCH and the first PDCCH correspond to the same CORESET pool.

2. The method according to claim 1, wherein there is a correspondence between the power control process and a CORESET pool corresponding to the first PDCCH.

3. The method according to claim 1, wherein the indication information of the power control process is a sounding reference signal resource indicator (SRI), and there is a correspondence between a value of the SRI and an index of the power control process.

4. The method according to claim 3, wherein there is a correspondence between the value of the SRI and a power control parameter set used in the power control process.

5. The method according to claim 1, wherein before the determining the transmit power based on the power control process corresponding to the network device, the method further comprises:
sending feedback information for PDSCHs from different network devices on different physical uplink control channels (PUCCHs).

6. A power control apparatus, wherein the apparatus is used on a terminal, and the terminal has a capability of supporting a configuration with a plurality of control resource set (CORESET) pool indexes, the terminal is configured with a plurality of CORESET pool indexes, or the terminal has a capability of supporting a configuration with a plurality of CORESET pool indexes and is configured with the plurality of CORESET pool indexes, and the apparatus comprises at least one processor, and one or more memories coupled to the at least one processor and storing programming instructions for execution by the at least one processor to perform operations comprising:
receiving a first physical downlink control channel (PDCCH) sent by a network device, wherein the first PDCCH carries a power offset corresponding to a physical uplink shared channel (PUSCH);
determining a transmit power based on a power control process corresponding to the network device, wherein the power control process is used for accumulating power offsets carried by PDCCHs from the network device, and determining the transmit power for the PUSCH based on an accumulation result; and
sending the PUSCH to the network device at the transmit power,
wherein the operations further comprises:
before the determining the transmit power based on the power control process corresponding to the network device, receiving a second PDCCH sent by the network device, wherein the second PDCCH carries indication information of the power control process, the indication information indicates that there is a correspondence between the power control process and a CORESET pool corresponding to the second PDCCH, and the second PDCCH and the first PDCCH correspond to the same CORESET pool.

7. The apparatus according to claim 6, wherein there is a correspondence between the power control process and a CORESET pool corresponding to the first PDCCH.

8. The apparatus according to claim 6, wherein the indication information of the power control process is a sounding reference signal resource indicator (SRI), and there is a correspondence between a value of the SRI and an index of the power control process.

9. The apparatus according to claim 8, wherein there is a correspondence between the value of the SRI and a power control parameter set used in the power control process.

10. The apparatus according to claim 6, wherein the operations further comprises:
before determining the transmit power based on the power control process corresponding to the network device, sending feedback information for PDSCHs from different network devices on different physical uplink control channels (PUCCHs).

11. The apparatus according to claim 6, wherein the apparatus is a terminal device.

12. A non-transitory computer-readable storage medium, wherein the computer-readable storage medium stores a program or instructions for being executed by at least one processor to perform operations comprising:
receiving a first physical downlink control channel (PDCCH) sent by a network device, wherein the first PDCCH carries a power offset corresponding to a physical uplink shared channel (PUSCH);
determining a transmit power based on a power control process corresponding to the network device, wherein the power control process is used for accumulating power offsets carried by PDCCHs from the network device, and determining the transmit power for the PUSCH based on an accumulation result; and
sending the PUSCH to the network device at the transmit power;
wherein the operations further comprise:
before the determining the transmit power based on the power control process corresponding to the network device, receiving a second PDCCH sent by the network device, wherein the second PDCCH carries indication information of the power control process, the indication information indicates that there is a correspondence between the power control process and a control resource set (CORESET) pool corresponding to the second PDCCH, and the second PDCCH and the first PDCCH correspond to the same CORESET pool.

13. The non-transitory computer-readable storage medium according to claim 12, wherein there is a correspondence between the power control process and a control resource set (CORESET) pool corresponding to the first PDCCH.

14. The non-transitory computer-readable storage medium according to claim 12 wherein the indication information of the power control process is a sounding reference signal resource indicator (SRI), and there is a correspondence between a value of the SRI and an index of the power control process.

15. The non-transitory computer-readable storage medium according to claim 14, wherein there is a correspondence between the value of the SRI and a power control parameter set used in the power control process.

16. The non-transitory computer-readable storage medium according to claim 12, wherein the operations further comprises:
before determining the transmit power based on the power control process corresponding to the network device, sending feedback information for PDSCHs from different network devices on different physical uplink control channels (PUCCHs).

* * * * *